United States Patent
Goldstein et al.

(10) Patent No.: US 12,495,034 B1
(45) Date of Patent: Dec. 9, 2025

(54) METHODS, SYSTEMS AND COMPUTER READABLE MEDIA FOR PROVIDING A DISTRIBUTED INFRASTRUCTURE

(71) Applicant: Keysight Technologies, Inc., Santa Rosa, CA (US)

(72) Inventors: Steven Paul Goldstein, Fort Collins, CO (US); Keith Charles Thompson, Fort Collins, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 221 days.

(21) Appl. No.: 18/135,722

(22) Filed: Apr. 17, 2023

Related U.S. Application Data

(60) Provisional application No. 63/449,011, filed on Feb. 28, 2023.

(51) Int. Cl.
*H04L 9/40* (2022.01)
*G06F 8/65* (2018.01)

(52) U.S. Cl.
CPC .............. *H04L 63/083* (2013.01); *G06F 8/65* (2013.01)

(58) Field of Classification Search
CPC ................................ H04L 63/083; G06F 8/65
See application file for complete search history.

(56) References Cited

U.S. PATENT DOCUMENTS

| | | | |
|---|---|---|---|
| 6,915,278 B1 * | 7/2005 | Ferrante | G06F 21/105 380/201 |
| 8,789,157 B2 | 7/2014 | Sinn | |
| 9,418,216 B2 | 8/2016 | Wetter et al. | |
| 9,660,999 B2 | 5/2017 | Wolman et al. | |
| 9,742,780 B2 | 8/2017 | Junuzovic et al. | |
| 9,754,100 B1 * | 9/2017 | Hitchcock | H04L 9/0891 |
| 10,044,723 B1 * | 8/2018 | Fischer | H04L 63/102 |
| 10,051,455 B2 * | 8/2018 | Jeng | H04L 67/10 |
| 10,291,477 B1 | 5/2019 | Askar | |
| 10,454,940 B2 | 10/2019 | Lander et al. | |
| 10,645,073 B1 * | 5/2020 | Agarmore | G06F 21/30 |

(Continued)

FOREIGN PATENT DOCUMENTS

WO 2022271957 12/2022

OTHER PUBLICATIONS

Commonly-assigned, co-pending U.S. Appl. No. 18/133,340 for "Methods, Systems, and Computer Readable Media for Implementing User Authorization in Cloud Applications" (Unpublished, filed Apr. 11, 2023).

(Continued)

*Primary Examiner* — Ghodrat Jamshidi

(57) ABSTRACT

A method for providing a distributed infrastructure, the method comprising: at a main distributed infrastructure controller (MDIC): sending one or more broadcast or advertisement messages via one or more mechanisms for notifying a client or a sub distributed infrastructure controller (SDIC); initiating an authentication service for authorizing and authenticating incoming connection requests from the client or the SDIC; receiving a connection request from the client or the SDIC; authenticating, using credentials and the authentication service, the connection request, wherein the authentication service generates or obtains an authentication token usable for secure communications; and providing the authentication token to the client or the SDIC.

20 Claims, 4 Drawing Sheets

(56) References Cited

U.S. PATENT DOCUMENTS

| | | | |
|---|---|---|---|
| 10,904,749 B2 | 1/2021 | Circosta et al. | |
| 10,979,299 B1 | 4/2021 | Askar | |
| 11,026,072 B2* | 6/2021 | Shen | H04W 28/22 |
| 2010/0242084 A1* | 9/2010 | Keeni | H04L 63/20 |
| | | | 726/1 |
| 2014/0081893 A1* | 3/2014 | Modha | G06N 3/061 |
| | | | 706/26 |
| 2015/0347738 A1* | 12/2015 | Ulrich | G06F 21/34 |
| | | | 726/17 |
| 2016/0088064 A1* | 3/2016 | Chen | H04L 67/568 |
| | | | 709/204 |
| 2017/0075677 A1* | 3/2017 | Gross | G01R 31/44 |
| 2019/0020659 A1 | 1/2019 | Loni et al. | |
| 2022/0043893 A1 | 2/2022 | Goecke et al. | |
| 2022/0269801 A1 | 8/2022 | Hua et al. | |
| 2023/0068836 A1* | 3/2023 | Kobana | H04N 1/00228 |
| 2023/0092902 A1 | 3/2023 | Jiang et al. | |
| 2024/0129734 A1* | 4/2024 | Segal | H04Q 9/00 |

OTHER PUBLICATIONS

Han, et al., "Semantic service provisioning for smart objects: Integrating IoT applications into the web", Future Generation Computer Systems, 76 (2017) 180-197.

Non-Final Office Action for U.S. Appl. No. 18/133,340, filed Feb. 25, 2025.

Advisory Action for U.S. Appl. No. 18/133,340 (Oct. 1, 2025).

* cited by examiner

METHODS, SYSTEMS AND COMPUTER READABLE MEDIA FOR PROVIDING A DISTRIBUTED INFRASTRUCTURE

PRIORITY CLAIM

This application claims the priority benefit of U.S. Provisional Patent Application Ser. No. 63/449,011, filed Feb. 28, 2023, the disclosure of which is incorporated herein by reference in its entirety.

TECHNICAL FIELD

The subject matter described herein relates to distributed infrastructures. More particularly, the subject matter described herein relates to methods, systems, and computer readable media for providing a distributed infrastructure.

BACKGROUND

A distributed or common infrastructure (e.g., a network and/or framework for connecting various entities) can be utilized by multiple solutions. For example, a tester in a research and development department may utilize a variety of interconnected devices or software, such as test stations, computers, instruments (e.g., ohm meter, oscilloscope, signal analyzer, power supply), devices under test (DUTs), testing software or agents, etc. While a test and measurement (T&M) manufacturer or other entity can utilize an Ethernet and/or internet protocol (IP) protocol or related infrastructure for communications between its products and various equipment, such infrastructure may lack certain features that can improve user experience and productivity while reducing learning curves or other issues. For example, a test solutions manufacturer or other entity may want an infrastructure for discovering and controlling multiple test devices or instruments and/or for performing services that are missing or not standard in existing networks or infrastructure.

SUMMARY

The subject matter described herein includes methods, systems, and computer readable media for providing a distributed infrastructure. A method for providing a distributed infrastructure includes at a main distributed infrastructure controller (MDIC): sending one or more broadcast or advertisement messages via one or more mechanisms for notifying a client or a sub distributed infrastructure controller (SDIC); initiating an authentication service for authorizing and authenticating incoming connection requests from the client or the SDIC; receiving a connection request from the client or the SDIC; authenticating, using credentials and the authentication service, the connection request, wherein the authentication service generates or obtains an authentication token usable for secure communications; and providing the authentication token to the client or the SDIC.

A system for providing a distributed infrastructure includes at least one processor, a memory and an MDIC, implemented using the at least one processor and the memory, where the MDIC is configured for: sending one or more broadcast or advertisement messages via one or more mechanisms for notifying a client or a sub distributed infrastructure controller (SDIC); initiating an authentication service for authorizing and authenticating incoming connection requests from the client or the SDIC; receiving a connection request from the client or the SDIC; authenticating, using credentials and the authentication service, the connection request, wherein the authentication service generates or obtains an authentication token usable for secure communications; and providing the authentication token to the client or the SDIC.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application-specific integrated circuits. In addition, a computer readable medium that implements the subject matter described herein may be located on a single device or computing platform or may be distributed across multiple devices or computing platforms.

As used herein, the term "node" refers to a physical device or node (e.g., at least one computing platform including one or more processors and memory) or a virtual device or node (e.g., a virtual machine (VM) or container running on a computing platform including one or more processors and memory).

As used herein, each of the terms "function", "engine", and "module" refers to hardware, firmware, or software in combination with hardware and/or firmware for implementing features described herein.

BRIEF DESCRIPTION OF THE DRAWINGS

Embodiments of the subject matter described herein will now be explained with reference to the accompanying drawings, wherein like reference numerals represent like parts, of which.

DETAILED DESCRIPTION

Figure 1:
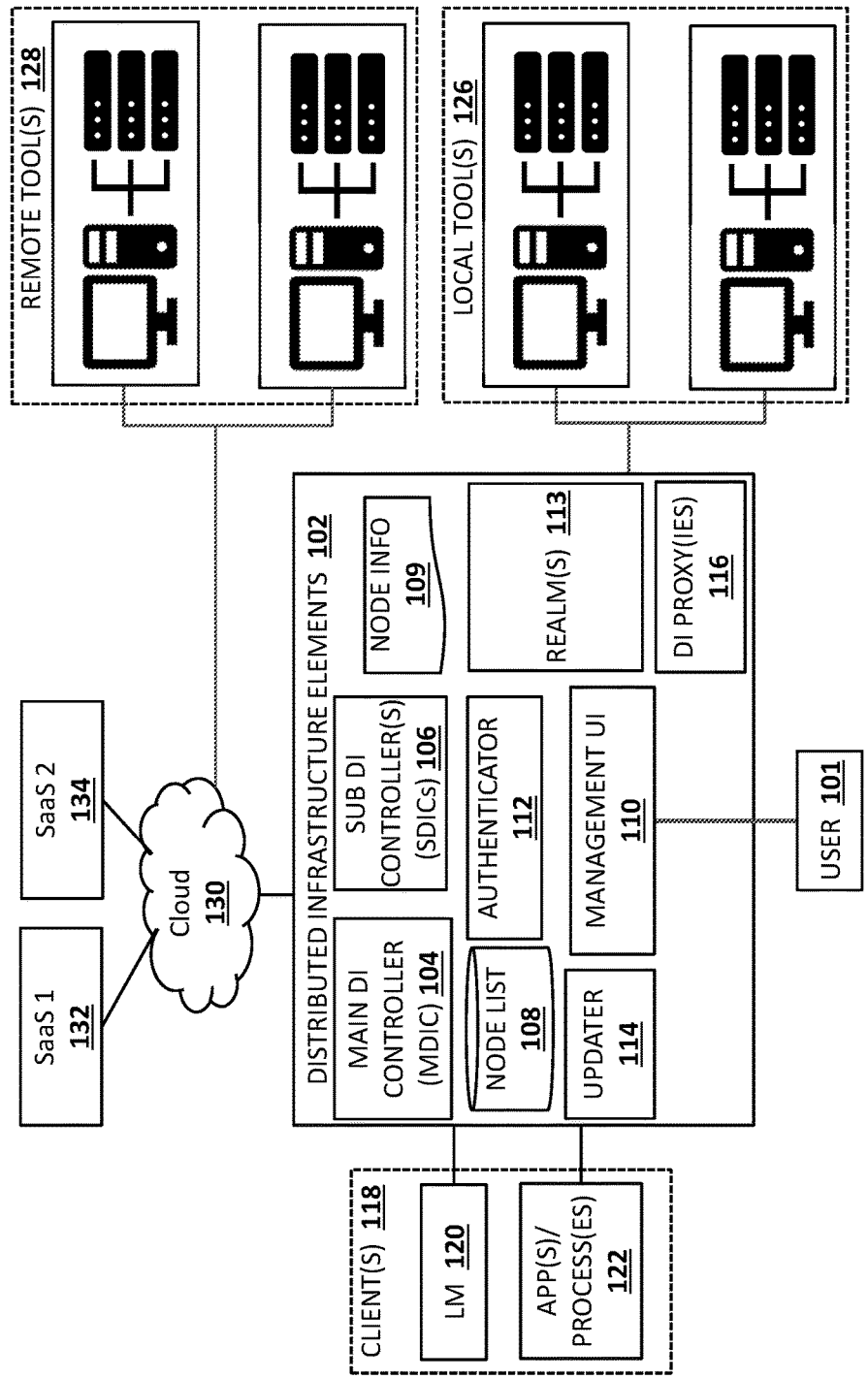
FIG. 1 is a block diagram illustrating an example distributed infrastructure (DI) environment including various distributed DI elements.

The subject matter described herein includes methods, systems, and computer readable media for providing a distributed infrastructure (DI). In some embodiments, a DI controller or another DI related entity in accordance with aspects described herein may provide a mechanism to facilitate connections between distributed applications or services (e.g., running processes or programs on a node) in a DI environment. For example, DI aware applications may need to know connection parameters for other DI aware applications and have a secure mechanism to interact with them. In this example, the DI controller or another DI related entity may include functionality to stop, start, update applications or services, and to relay information between DI aware or registered applications or services. In addition, the DI controller or another DI related entity may facilitate data transfer between applications or services on networks connected via a DI environment or related entity, e.g., a DI proxy.

In some embodiments, a DI controller or another DI related entity in accordance with aspects described herein may provide a generic framework for managing and controlling distributed applications or services. For example, a DI controller or another DI related entity may allow for managing arbitrary services on distributed nodes (e.g., physical machines, virtual machines, or containers) that are registered or accessible via a DI environment.

In some embodiments, a DI controller or another DI related entity in accordance with aspects described herein may utilize or provide dynamic configurations, security, software updates, inter-network communications (e.g., across multiple local area networks (LANs) or subnetworks), application control and monitoring, and application, service, or node discovery to various entities in the DI environment. Further, in some embodiments, the DI controller or another DI related entity may provide scalability, e.g., allowing users to find, configure and manage thousands of applications (e.g., client applications, services, processes, etc.) in a way that is not burdensome to the user.

In some embodiments, after a node is authenticated and connected to a DI environment in accordance with various aspects described herein, processes (e.g., applications, services, etc.) on this node can query a DI controller for various information about a known or registered process (e.g., information usable to start or stop a process, obtain status information about the process, or communicate with the process) and this known or registered process may reside on various nodes that are also authenticated and connected to the DI environment. In such embodiments, by using the DI environment and related framework, a process or user thereof can securely manage, control, and interconnect processes on multiple (e.g., tens, hundreds, thousands, etc.) nodes from one location.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example DI environment 100 including various DI elements (DIEs) 102. In some embodiments, DIEs 102 may include or represent any suitable entity or entities (e.g., one or more testing platforms, nodes, devices, software executing on one or more processors) for performing various functions or aspects associated with providing a DI environment 100 or related features. Example DIEs 102 may include a DI controller (e.g., a main DI controller (MDIC) 104, one or more sub DI controllers (SDICs) 106, etc.), a data store (e.g., computer readable media for storing node or entity information (e.g., registration information, credentials, connection details, service capabilities, etc.), a node list 108, a node information 109, etc.); an authenticator (e.g., an authenticator 112) or related services for authenticating users, nodes, or other entities, a communications interface or user interface (UI) (e.g., a management UI 110), a gateway or related services (e.g., realm(s) 113) for facilitating secure communications or authentication procedures, an updater (e.g., an updater 114) or related services for updating software of DIEs 102 or related functions; or a proxy (e.g., a DI proxy 116) or related services for facilitating communications between subnetworks or network portions of DI environment 100.

In some embodiments, DI environment 100 or one or more DIEs 102 thereof may provide various features of an infrastructure or framework that can be utilized for various test solutions or other purposes. For example, DI environment 100 or various DIEs 102 thereof may include or provide functionality for discovering DI aware or registered entities (e.g., clients 118, local tool(s) 126, remote tool(s) 128, test stations, computers, instruments, devices under test, nodes, devices, software as a service (SaaS) solutions 132 and 134, applications, etc.); functionality for discovering services and node information for registered entities; functionality for adding, deleting, updating, or managing solution specific services on registered entities; functionality for authenticating access to registered entities; functionality for establishing communications with registered entities; and/or functionality for facilitating control and/or data communications between two registered entities or services (e.g., across networks or subnetworks connected by two SDICs 106 or DI proxy 116 via one or more communications protocols).

In some embodiments, DI environment 100 or DIEs 102 may include one or more DI controllers (e.g., MDIC 104, SDICs 106, etc.) for facilitating registration, device discovery, service discovery, device/service interactions, authentication, and software updates. For example, MDIC 104 may enable services and devices to register their presence on the network (e.g., for allowing DI aware or registered entities to discover them) and connect securely.

In some embodiments, DI controllers (e.g., MDIC 104, SDICs 106, etc.) may include hardware based instances or software based instances running on different nodes and may be hierarchical in nature. For example, in DI environment 100, a main DI controller (MDIC) 104 may represent a master central, or root manager capable of managing one or more SDIC(s) 106 and for performing various centralized management functions or services. In this example, one MDIC 104 may be active in DI environment 100, but multiple SDICs 106 may be active for performing management related functions for DI aware entities in different portions of DI environment 100 (e.g., subnetworks).

In some embodiments, SDICs 106 may be hierarchical. For example, where MDIC 104 may act as a root or centralized manager, one type of SDICs 106 may be a branch DI controller (e.g., a higher-level SDIC) for managing DI entities in a distinct subnetwork (e.g., a virtual local area network (VLAN)) and may also manage one or more leaf DI controllers (e.g., a lower-level SDIC). In this example, each leaf DI controller may be configured for managing particular tools or services or for managing DI aware entities in a subnetwork of the subnetwork.

In some embodiments, MDIC 104 or other entities (e.g., higher-level and/or lower-level SDICs 106) may advertise themselves (e.g., via a network protocol or mechanism) after or concurrently with being initialized (e.g., after or during MDIC 104 starting up). For example, MDIC 104 may utilize a domain name service (DNS) message or a mobile DNS (mDNS) message for notifying SDIC(s) 106 or other entities (e.g., DI aware nodes) about its existence and also start one or more services or DIEs for performing related management or authentication functions, e.g., an authenticator 112.

In some embodiments, network or node discovery (e.g., of MDIC 104 or other entities) may utilize various mechanisms or methods. For example, each SDIC 106 may utilize environment variables (e.g., preconfigured data or information for accessing such data), a configuration file (e.g., an xml file indicating a network address or other information for connecting to MDIC 104 or interacting with DI environment 100), a DNS service, or a mDNS service to identify or discover MDIC 104. In this example, after obtaining a network address and port number associated with MDIC 104, each SDIC 106 may send a connection request (e.g., a registration request) to MDIC 104 for registration, obtaining an authentication token (e.g., JSON web token (JWT)), and/or to enable interaction with DI environment 100 or related entities.

In some embodiments, MDIC 104 may utilize various DIEs 102 to authenticate a connection request or a requester thereof. For example, after receiving a connection request from a client application or one of SDICs 106, MDIC 104 may send the connection request or information thereof (e.g., credentials and/or other information) to authenticator 112. In this example, authenticator 112 may communicate with a third party or external authentication service provider (e.g., via realm(s) 113) to obtain an authentication token for the requester to allow for secure communications. In another example, authenticator 112 may include functionality to validate credentials and generate an authentication token for the requester.

In some embodiments, MDIC 104 may include functionality for enabling or allowing registered entities (e.g., client(s) 118) to get a list of connected or registered entities (e.g., local tool(s) 126, remote tool(s) 128, SaaS 132 and/or 134 connected via a cloud network 130, etc.); to enquire about services that an entity offers; to request starting or stopping a specific service offered by connected entities; and to enquire about address information (e.g., an IP address and port number) for communicating directly with itself or a relevant SDIC 106.

In some embodiments, when a new SDIC 106 (e.g., a branch or leaf DI controller) initializes or starts up, SDIC 106 may obtain address information for communicating with MDIC 104 (e.g., a root DI controller) (e.g., via a configuration file, an environmental variable, network discovery messages, or other means) and may attempt to register with or connect to DI environment 100 by sending a connection request (e.g., a registration request or a precursor to a registration request) with relevant credentials (e.g., a username and password) to MDIC 104 and waiting for an authentication token in response. In such embodiments, after a successful authentication and obtaining an authentication token from MDIC 104, SDIC 106 may send an identification identifier (also known as an agent identifier) to MDIC 104 (e.g., in a registration request or other message) and may await a service request (e.g., from client(s) 118 or other registered entity).

In some embodiments, where SDICs 106 include branch DI controller(s) and leaf DI controller(s), branch DI controller(s) may perform some functions similar to or same as MDIC 104 or may act as a proxy or gateway for MDIC 104). For example, a branch DI controller may operate like MDIC 104 for a subnet in which the branch DI controller resides. In this example, a branch DI controller may include functionality for allowing isolated networks to join DI environment 100 or a related DI fabric. Continuing with this example, when a leaf DI controller initializes or starts up, the leaf DI controller may obtain address information for communicating with the branch DI controller (e.g., via a configuration file, an environmental variable, network discovery messages, or other means) and may attempt to register with or connect to DI environment 100 by sending a connection request (e.g., a registration request or a precursor to a registration request) with relevant credentials (e.g., a username and password) to the branch DI controller and waiting for an authentication token in response. In such embodiments, after a successful authentication and obtaining an authentication token from the branch DI controller, the leaf DI controller may send an identification identifier (also known as an agent identifier) and information about providable or registered services (e.g., connection or address information, metadata, etc.) to the branch DI controller (e.g., in a registration request or other message) and may await a service request (e.g., from client(s) 118 or other registered entity).

Authenticator 112 may represent a suitable entity (e.g., a node, a device, an application, a service, or software executing on one or more processors) for providing authentication or related functions. In some embodiments, authenticator 112 may include a standalone, cross-platform, and/or lightweight gateway service or function for authenticating incoming connection requests and may be launched, configured, or controlled by MDIC 104, SDICs 106, or another DI controller. In such embodiments, authenticator 112 may receive authentication and validation requests (e.g., MDIC 104, SDIC 106, etc.) and then send those requests or related information to a third-party or external authentication service provider (e.g., using realm(s) 113) that issues a JWT for entities (e.g., client(s) 118, applications, etc.) to securely connect to each other. For example, using realm(s) 113 or otherwise, authenticator 112 may be configured for adding, deleting, and updating users; registering service providing entities (e.g., tools 126 and 128 like test stations and instruments) to DI environment 100 (e.g., an internet of things (IoT) framework); and registering service requesting entities (e.g., client(s) 118, applications, etc.) with credentials.

In some embodiments, authenticator 112 may be configured for integrating with third-party or external authentication service providers for authorizing and authenticating connections between DIEs 102 or services in DI environment 100. For example, authenticator 112 may include or interact with realm(s) 113.

Realm(s) 113 may represent or include one or more data stores for storing users and credentials managed by an identity provider or a related entity (e.g., an external or third party authentication service provider). In some embodiments, realm(s) 113 may also include or refer to software, an identity provider, or a related entity for facilitating authentication functions associated with a user-credentials data store. For example, realm(s) 113 include credentials or authentication information managed by an identity and access management (IAM) system or an identity provider, e.g., an identity server or related software that utilizes a security assertion markup language (SAML), an OAuth authentication flow, or similar technology. In this example, realm(s) 113 or related software may be initialized, configured, or installed by a DI controller or authenticator 112. In some embodiments, authenticator 112 utilizing realm(s) 113 may facilitate authentication functions, receiving, generating, or obtaining authentication tokens, or performing other functions involving third-party or external authentication service providers or various external authentication frameworks.

In some embodiments, after receiving an authentication request comprising credentials, authenticator 112 may validate the credentials against a credentials data store (e.g., locally or externally via realm(s) 113) and return an authentication token (e.g., a JWT) on a successful match, validate already issued tokens, authorize a connection, or issue a public key for validation purposes.

Updater 114 may represent a suitable entity (e.g., a node, a device, an application, a service, or software executing on one or more processors) for providing or installing software updates or related packages. For example, updater 114 may include an application or program (e.g., a running process or instance) that interacts with an update server or a related update data store comprising software update packages and may automate or facilitate software updates of DIEs 102 or other entities in DI environment 100. In some embodiments, updater 114 may be launched, configured, or controlled by MDIC 104, SDICs 106, or another entity, e.g., a licensing manager (LM) 120. For example, LM 120 or another entity may connect to MDIC 104 (or an appropriate SDIC 106) and collect license software information of all DI connected entities. In this example, if LM 120 or another entity discovers that some nodes need a latest update, LM 120 or another entity may cause MDIC 104 (or an appropriate SDIC 106) to start updater 114 on those nodes. Continuing with this example, each updater 114 may obtain the latest version of the software and initiate and manage the update at its respective node.

Data stores (e.g., node list 108, node information 109, etc.) may represent any suitable entities (e.g., storage platform(s), computer readable media, or data structures) for storing information usable for performing or facilitating DI related functions. For example, node list 108 may represent a data structure accessible or maintained by MDIC 104 for storing a list of active and registered nodes, applications, services, etc. In another example, node information 109 may represent a data structure accessible or maintained by a DI controller (e.g., SDIC 106) at a node for storing address information for communicating with various services or applications executing on the node.

Management UI 110 may represent a suitable entity (e.g., a node, a device, an application, a service, or software executing on one or more processors) for providing a user interface for managing aspects of DI environment 100. For example, management UI 110 may include a graphical user interface (GUI) for allowing user 101 to add, remove, or update users or entities (e.g., to approve a provisional node or user) that can connect to or interact with DI environment 100 or DIEs 102 thereof. In some embodiments, management UI 110 may include or provide a GUI or user interface for providing, e.g., to user 110, statistics, status information, or other monitored or derived information about nodes or services in DI environment 100. For example, some DIEs or other entities may provide status information and related operating statistics (e.g., log files and/or error messages) to management UI 110 or a related entity. In this example, management UI 110 may display this information via an interactive GUI, or another manner (e.g., via a command line or API). In some embodiments, management UI 110 may include or provide a GUI or user interface for allowing user 110 to manually control (e.g., stop or start) services or perform other management actions.

DI proxy 116 may represent a suitable entity (e.g., a node, a device, an application, a service, or software executing on one or more processors) for facilitating communications or data exchanges between DI connected entities (e.g., client(s) 118 or services) in different networks or subnets (e.g., network portions) and may be integrated with or separate from SDIC 106, MDIC 104, or other DIEs 102. For example, DI proxy 116 may be an application or software for tunneling data or messages between subnets. In this example, each subnet may have a registered or trusted DI proxy 116 for providing access to or from local services or nodes in the respective subnet.

Client(s) 118 may represent a suitable entity or entities (e.g., nodes, devices, applications, services, or software executing on one or more processors) for connecting to or utilizing DI environment 100 to securely access information, status, and control features associated with DI related or DI aware nodes of DI environment 100. For example, client 118 may include or represent an application or a related node that connects to or registers with DI environment 100 via MDIC 104 and then sends a service request or data request to another DI connected entity (e.g., another client 118 or one of tools 126 and 128). In another example, e.g., in addition to consuming or receiving services or related data, client(s) 118 may act as a service provider, e.g., by providing services or related data.

In some embodiments, client(s) 118 may include an entity (e.g., a management device, or a related application or process) that builds, configures, or interacts with a test solution and wants to utilize devices (e.g., test stations, instruments, DUTs, etc.) or services that are local to the entity (e.g., local tool(s) 126) or that are remote or distributed across networks or locations (e.g., remote tool(s) 128, SaaS 132 or SaaS 134 via cloud network 130). For example, client(s) 118 may include LM 120 or one or more application(s) or process(es) (A/P) 122. For example, A/P 122 may include a test and measurement (T&M) application for controlling or coordinating various instruments, a test station manager for coordinating deployment and execution of independent tests across various test stations and instruments, or a configuration manager for configuring test stations and instruments for a T&M application or another entity.

Local tool(s) 126 may represent or include a suitable entity or entities (e.g., e.g., test stations, test instruments, DUTs, nodes, devices, etc.) for performing various services or functions (e.g., a test function or a calibration function) and may be local to one or more clients 118. Remote tool(s) 128 may represent or include a suitable entity or entities (e.g., test stations, test instruments, DUTs, nodes, devices, etc.) for performing various services or functions (e.g., a test function or a calibration function) and may be remote to one or more clients 118. For example, local tool(s) 126 may be located in the same LAN or subnet as clients 118 and remote tool(s) 128 may be located remotely from clients 118 but connected to DI environment 100 via cloud network 130. In another example, e.g., in addition to providing services or related data, tool(s) 126 or 128 may act as a service requester or consumer, e.g., by requesting and receiving services or related data.

In some embodiments, tool(s) 126 or 128 may represent or refer to one or more test environment(s), test lab(s), or test setup(s), e.g., instrument(s) and/or device(s) to be tested or measured by the instrument(s). For example, remote tool(s) 128 may refer to a test setup or lab comprising instruments or test stations for testing or measuring DUTs and may be located in the same network as clients 118, while remote tool(s) 128 may refer to a different test setup or lab comprising instruments or test stations for testing or measuring DUTs and may be located in a different network from clients 118.

SaaS 132 and 134 may represent or include a suitable entity or entities (e.g., nodes, devices, applications, services, or software executing on one or more processors) for acting as client(s) 118 and/or tool(s) 126 or 128, e.g., test setups. For example, SaaS 132 may be configured for connecting to and registering with DI environment 100 and for interacting with or requesting services provided by DI connected entities, e.g., to generate or implement a test solution. In another example, SaaS 134 may be configured for connecting to and registering with DI environment 100 and for providing services or related data to clients 118.

In some embodiments, local tool(s) 126 or remote tool(s) 128 or other DI connected entities may register applications, services, or functions that can be accessed or utilized by client(s) 118. For example, an application or a service may include an executable program executing on a physical or virtual node and may implement DI application programming interfaces (APIs) for receiving service requests and providing service responses. In this example, the application or service may be registered with DI environment 100 by providing service configuration information (e.g., a service or .svc file in a registration request) to a relevant DI controller, e.g., MDIC 104, SDIC 106, etc. In some embodiments, service configuration information may include information that a DI controller needs to register or run the service and other information (e.g., metadata) for advertising or describing the service. In some embodiments, MDIC 104 or another entity may receive a global configuration file for indicating a list of applications, services, or functions accessible via DI environment 100 and, in response, may generate a corresponding global services list that can be provided to registered DI entities (e.g., in response to a service list query).

In some embodiments, a DI aware application or service can register (its presence (and version) to make it discoverable and manageable by client(s) 118. In some embodiments, after registration, a DI aware application or service may be capable of interacting with client(s) 118, other services, or other DI connected entities. In some embodiments, a DI aware application or service can create instances of the service for different clients 118. In some embodiments, a DI aware application or service can exchange initialization or communication information (e.g., an assignable dynamic port) with client(s) 118.

It will be appreciated that FIG. 1 is for illustrative purposes and that various depicted entities, their locations, and/or their functions described above in relation to FIG. 1 may be changed, altered, added, or removed.

Figure 2:
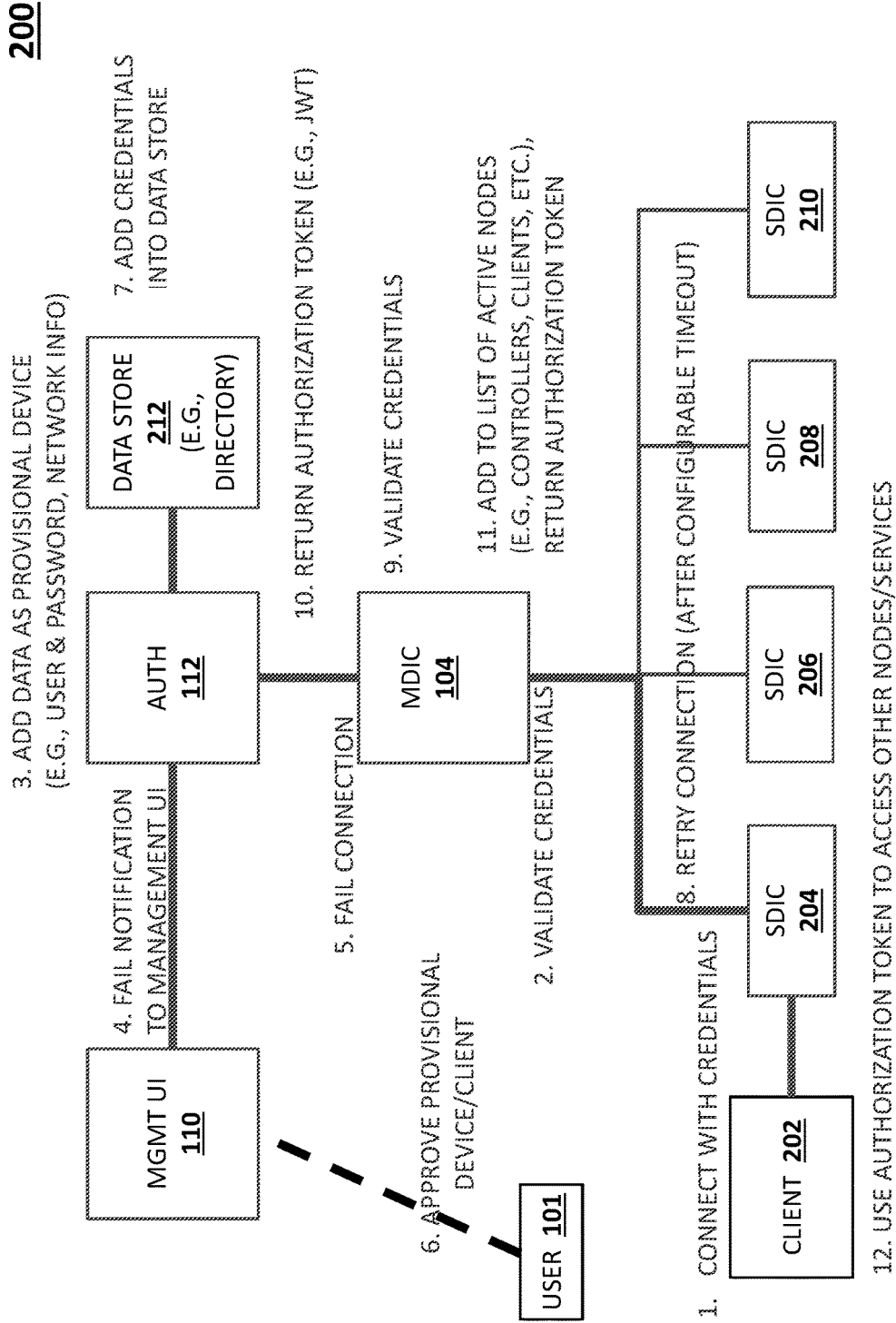
FIG. 2 is a block diagram illustrating an example connection or registration scenario involving a DI environment.

FIG. 2 is a block diagram illustrating an example connection or registration scenario involving a DI environment 200. In some embodiments, environment 200 may include aspects or various DIEs 102 with the same or similar functionality as described above with regard to DI environment 100. DI environment 200 may include a client 202, SDICs 204-210, and a data store 212.

Client 202 may include functionality with the same or similar functionality as described above with regard to client(s) 118. In some embodiments, client 202 may connect to or utilize DI environment 200 to securely access information, status, and control features associated with DI related or DI aware nodes of DI environment 200. For example, client 202 may include or represent an application or a related node that connects to or registers with DI environment 200 via SDIC 204.

Each of SDICs 204-210 may include functionality that is the same as or similar to functionality associated with SDIC 106 described herein. For example, each of SDICs 204-210 may act as a branch DI controller for particular subnetworks or certain types of services or nodes. In this example, each of SDICs 204-210 may perform some control or management functions but may also interact with MDIC 104 and request MDIC 104 to perform other control or management functions.

Data store 212 may represent any suitable entity (e.g., a computer readable medium, a database, a storage device, or memory) for storing connection information, credentials, and/or other information about active and/or registered entities (e.g., clients, nodes, service instances, etc.). For example, data store 212 may represent or include computer readable media for storing a DI related repository comprising information about DI registered entities, e.g., nodes, client applications, service providers, service requesters, local tool(s) 126, or local tool(s) 128, etc.

In FIG. 2, MDIC 104 may manage and/or interact with one or more of SDICs 204-210. Each of SDICs 204-210 may include functionality that is the same as or similar to functionality associated with SDIC 106 described herein. In some embodiments, each of SDICs 204-210 may manage or act as a controller for clients (e.g., applications, nodes, etc.) located in a particular network or network portion (e.g., a subnet) associated with DI environment 200. In some embodiments, MDIC 104 or a related entity (e.g., authenticator 112) may utilize data store 212 for storing connection information, credentials, service information, node information, and/or other information.

In some embodiments, SDIC 204 (e.g., software executing on at least one processor of at least one computing platform or a virtual container) may be initialized or deployed and may be configured to determine connection information (e.g., a network address) for communicating with MDIC 104. For example, SDIC 204 may be configured to utilize domain name server (DNS), mobile DNS (mDNS), or other mechanisms to identify the network address of MDIC 104.

Referring to FIG. 2, in step 1, SDIC 204 may send a connection request with credentials (e.g., a username and a password provisioned by a network operator) to MDIC 104.

In step 2, MDIC 104 may validate or authenticate the credentials using authenticator 112. For example, authenticator 112 may receive credentials from MDIC 104 and then communicate with realm(s) 113 or a related third party authentication service to determine whether the credentials are valid.

In step 3, the validation or authentication of SDIC 204 may fail and authenticator 112 or another entity may store information about SDIC 204 as a provisional device (e.g., in data store 212). In some embodiments, SDIC information may be stored in data store 212 (e.g., a DI entity directory or repository) and may include the username and password, and network or connection information (e.g., a network address) for communicating with SDIC 204.

In step 4, management UI 110 or a related entity may be notified (e.g., by authenticator 112) about the failed connection attempt. In some embodiments, the failed connection attempt notification may act as a device approval request for prompting user 101 (e.g., an administrator or other user) to approve the provisional device (e.g., SDIC 204) to access DI environment 200 or register with MDIC 104.

In step 5, e.g., concurrently with messages between sent between authenticator 112 and management UI 110, a message or indication indicating the failed connection attempt may be sent from authenticator 112 to MDIC 104.

In step 6, e.g., in response to the notification sent from authenticator 112 to management UI 110, user 101 (e.g., an administrator or other user) may view the notification (e.g., a device approval request) and approve the provisional device (e.g., SDIC 204) via management UI 110.

In step 7, authenticator 112 may receive approval for the provisional device (e.g., from user 101 via management UI 110) and store information about SDIC 204 as a non-provisional device (e.g., a registered or DI allowed device) in data store 212.

In step 8, e.g., in response to a connection request timeout or an error or failed connection response from MDIC 104, SDIC 204 may resend a connection request to MDIC 104. In some embodiments, SDIC 204 may be configured to retry after a failed connection attempt (e.g., every 3 minutes or a configurable time amount). For example, when attempting to connect to DI environment 200, SDIC 204 may retry at a specified time interval until user 101 (e.g., an administrator) logs into authenticator 112 or another DI entity (e.g., management UI 110) and approves the connection request or until the SDIC 204 or a related application ends.

In step 9, MDIC 104 may receive the connect request and validate or authenticate the credentials using authenticator 112. In some embodiments, authenticator 112 may utilize realm(s) 113 and/or a third-party authentication service or provider to determine whether credentials are valid and/or to obtain an authentication token (e.g., a JWT).

In step 10, authenticator 112 may generate or obtain (e.g., from a third-party) an authentication token and provide a successful response including the authentication token to MDIC 104.

In step 11, after successfully authenticating SDIC 204, MDIC 104 may add or update the status of SDIC 204 in data store 212 to indicate that SDIC 204 is active and may also provide the authentication token to SDIC 204.

In step 12, SDIC 204 may receive the authentication token from MDIC 104 and may use the authentication token in communicating with or accessing other DI entities, e.g., nodes and/or services.

In some embodiments, after SDIC 204 has been registered and authenticated, client 202 may send a connection request to SDIC 204 for registering itself and/or connecting to DI environment 200. In such embodiments, SDIC 204 may facilitate the registration or connection procedure of client 202 (e.g., by acting as a proxy or gateway). For example, SDIC 204 may send the connection request of client 202 onward to MDIC 104 and provide client 202 with an appropriate authentication token via MDIC 104. It will be appreciated that FIG. 2 is for illustrative purposes and that various depicted entities, their locations, and/or their functions described above in relation to FIG. 2 may be changed, altered, added, or removed.

Figure 3:
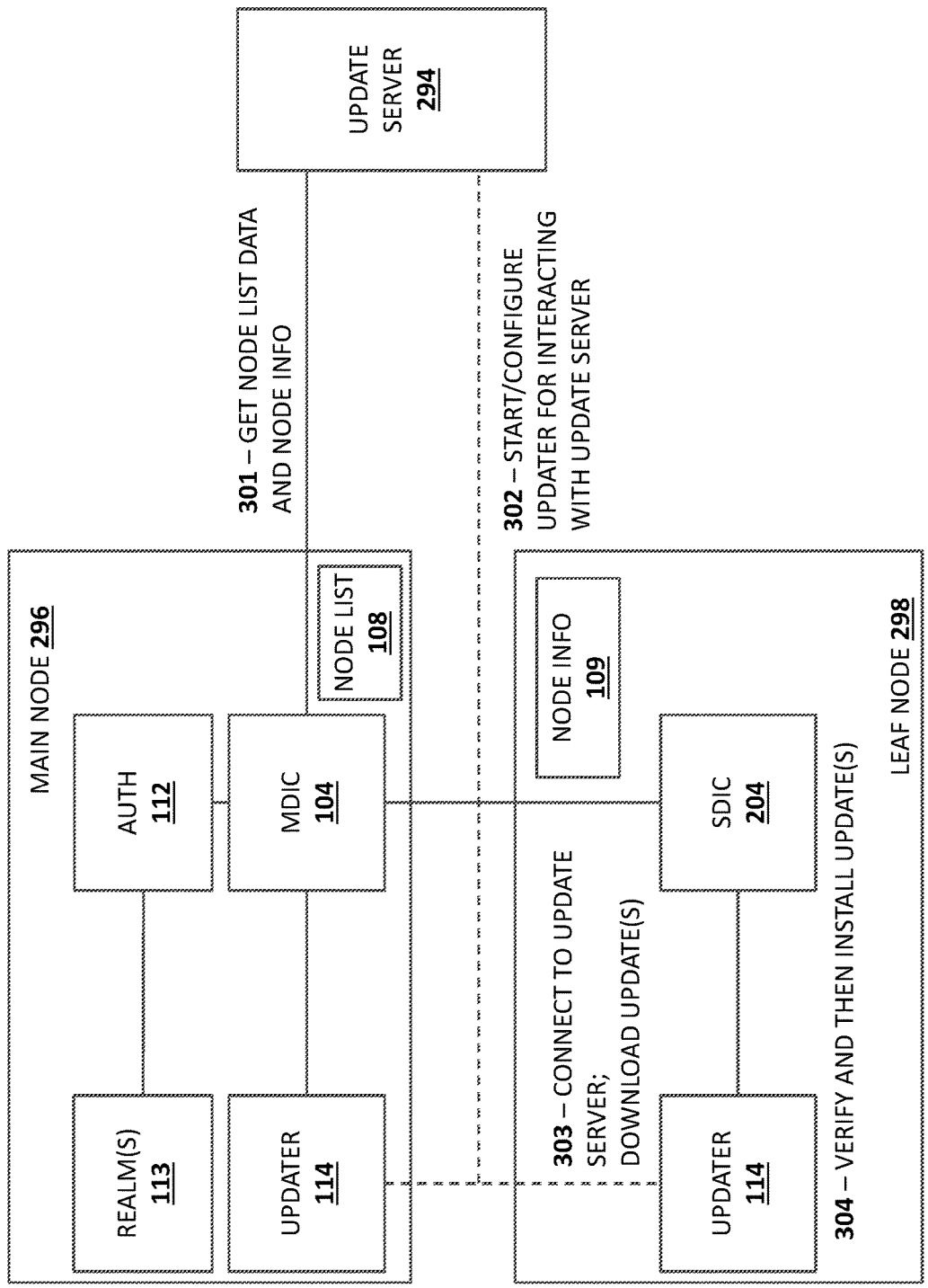
FIG. 3 is a block diagram illustrating an example DI environment comprising an update server.

FIG. 3 is a block diagram illustrating an example DI environment 300 comprising an update server 294. Update server 294 may represent or include a node (e.g., a computing platform or device) capable of providing software updates or related functionality. For example, update server 294 may include a data store (e.g., a storage area network or computer readable media) for storing software packages for updating nodes, services, or entities (e.g., DIEs 102) in DI environment 300. In this example, update server 294 may implement or support an update service for determining whether various entities in DI environment 300 need updates and/or facilitating updates (e.g., via MDIC 104, updater 114, or other DIEs 102).

In some embodiments, DI environment 300 may include MDIC 104 and SDIC 204 deployed on respective nodes, e.g., a main node 296 and a sub node 298. Main node 296 may represent or include a node (e.g., a computing platform or device) capable of providing or implementing MDIC 104 and/or management functionality for DI environment 300 or portions thereof, e.g., SDIC 204. For example, main node 296 may include MDIC 104, authenticator 112, realm(s) 113, and updater 114. In some embodiments, MDIC 104 may include functionality for communicating with SDIC 204 of sub node 298 and for providing various information (e.g., node list 108, node information 109, software versioning information, last update information, hardware details, etc.) about registered (or provisionally registered) entities (e.g., nodes, modules, services, etc.) to update server 294 or other entities. In some embodiments, updater 114 at main node 296 may be configured for communicating with update server 294 (e.g., via an API or a related protocol) and may download or receive software updates from update server 294 for updating one or more DIEs 102 at main node 296.

Sub node 298 may represent or include a node (e.g., a computing platform or device) capable of providing or implement SDIC 204 and/or management functionality for a portion of DI environment 300 (e.g., DIEs 102 associated with one or more local networks or subnets). For example, sub node 298 may include SDIC 204 and updater 114. In some embodiments, SDIC 106 may include functionality for communicating with MDIC 104 and for providing various information (e.g., node information 109, software versioning information, last update information, hardware details, etc.) about itself or entities it manages to various entities, such as MDIC 104 or update server 294. In some embodiments, updater 114 at sub node 298 may be configured for communicating with update server 294 (e.g., via an API or a related protocol) and may download or receive software updates from update server 294 for updating one or more DIEs 102 (e.g., SDIC 204) at sub node 298.

Referring to FIG. 3, in step 301, update server 294 (e.g., or an update or licensing service running thereon) may register with MDIC 104 and request and receive node list 108 indicating available or registered nodes along with node information 109, e.g., software versions or software licensing information.

In step 302, after detecting that one or more nodes needs software updates, update server 294 (e.g., or an update service running thereon) may trigger, configure, or initialize (e.g., via MDIC 104, SDIC 204, and/or using commands) updater 114 (e.g., an updater application that communicates with update server 294 or related entities) at the one or more nodes needing software updates.

In some embodiments, e.g., as part of this triggering, configuring or initializing, update server 294 (e.g., or an update service running thereon) may send connection information (e.g., a network address and/or port number) to each updater 114 for communicating with update server 294 (e.g., or an update service running thereon).

In step 303, each updater 114 may establish a connection with update server 294 (e.g., or an update service running thereon) and download one or more software update(s) (e.g., a signed package).

In step 304, each updater 114 may verify the software update(s) as authentic (e.g., using signatures, checksums, and/or other methods) and then install the software update(s).

It will be appreciated that FIG. 3 is for illustrative purposes and that various depicted entities, their locations, and/or their functions described above in relation to FIG. 3 may be changed, altered, added, or removed.

Figure 4:
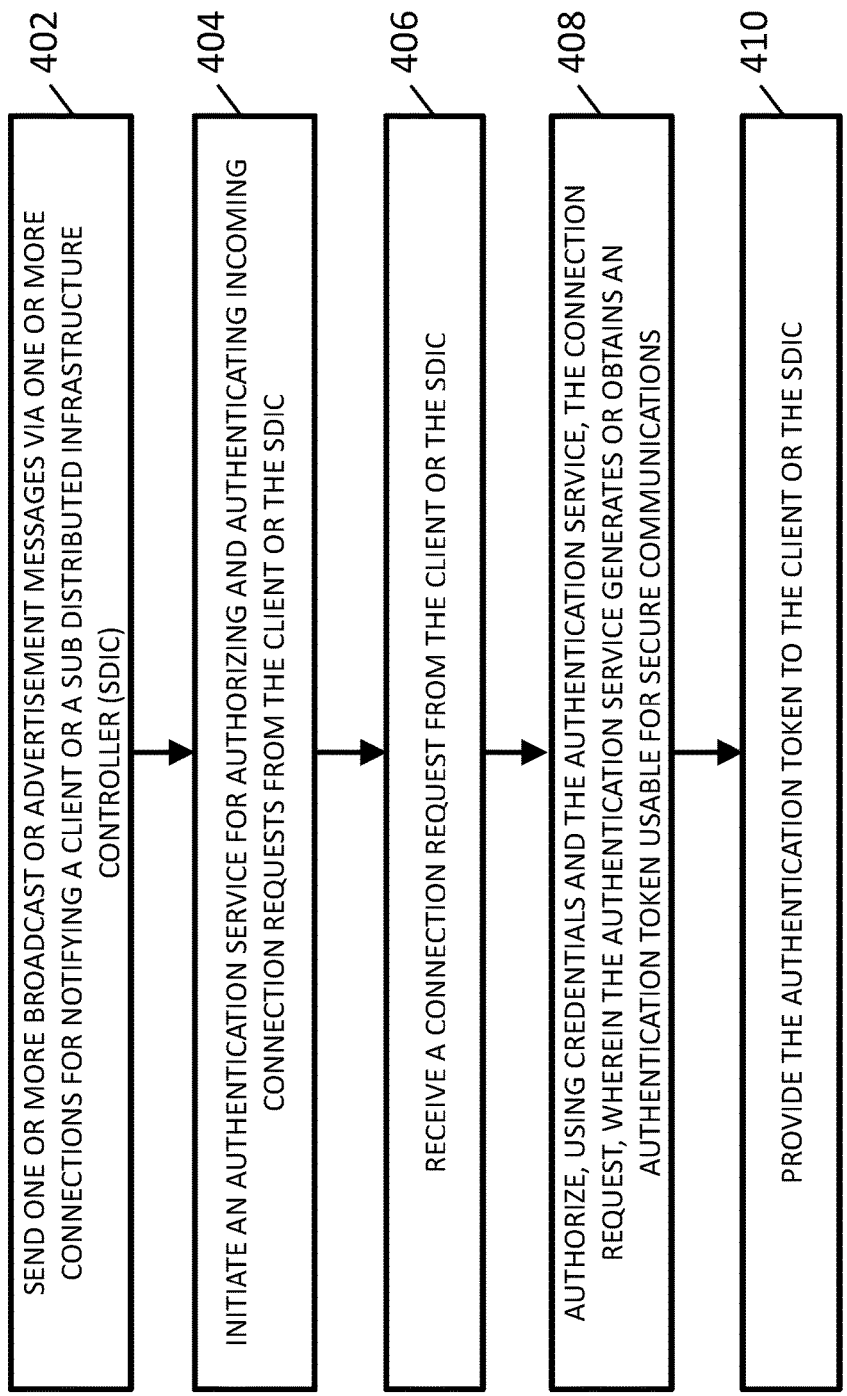
FIG. 4 is a flow chart illustrating an example process for providing a DI.

FIG. 4 is a diagram illustrating an example method or process 400 for providing a distributed infrastructure (e.g., nodes, components, or entities for facilitating secure communications and/or control of various applications, tools, or services). In some embodiments, process 400, or portions thereof, may be performed by or at a DI controller, MDIC 104, SDIC 106, a DI process or service, a DI related client, and/or another node or module.

Referring to process 400, in step 402, one or more broadcast or advertisement messages may be sent via one or more mechanisms (e.g., environment variables, configuration file, DNS, mDNS, etc.) for notifying a client (e.g., client 202, a device, a service, or a DI service requester) or an SDIC (e.g., SDIC 106, SDIC 204, SDIC 206, SDIC 208, or SDIC 210).

In step 404, an authentication service (e.g., authenticator 112) may be initiated (e.g., started, initialized, deployed, etc.) for authorizing and authenticating incoming connection requests from the client or the SDIC.

In step 406, a connection request (e.g., a pre-registration request, a registration request or a service request) may be received from the client or the SDIC.

In step 408, the connection request may be authenticated, using credentials (e.g., a username and a password associated with client 202) and the authentication service (e.g., authenticator 112). In some embodiments, an authentication service may generate or may obtain an authentication token, such as a JWT (e.g., from a third-party authenticator), usable for facilitating secure communications.

In step 410, the authentication token may be provided to the client or the SDIC. For example, after receiving an JWT from authenticator 112 (e.g., management UI 110), client 202 may send a service request to a local tool 126 (e.g., via DI proxy 116 or directly). In this example, local tool 126 may validate the authentication token in the service request and, if validated and available to handle the service request, may provide the service or related information, e.g., via a service response.

In some embodiments, e.g., after step 410, client 202 or SDIC 204 (e.g., of process 400) may be configured for: receiving, from MDIC 104, an authentication token; and sending, using the authentication token, a publication request for publishing an entity identifier (e.g., an agent identifier) for identifying client 202, SDIC 204, or a service or a service instance executing at client 202 or SDIC 204.

In some embodiments, an authentication service (e.g., of process 400) may be configured for: adding, deleting, or updating users (e.g., user 101 or client 202); registering entities or services for an internet of things (IOT) framework or a network (e.g., including storing relevant information in an entity registry or data store maintained by MDIC 104); or registering clients, applications, services or other entities using credentials (e.g., via realm(s) 113 and/or an external authentication service provider).

In some embodiments, an authentication service (e.g., of process 400) may be configured for: receiving an authentication request (e.g., from client 202 or SDIC 204) comprising the credentials or the authentication token; and performing one of the following actions: communicating with a third-party authentication provider for authorizing and authenticating a connection request between two or more entities; validating the credentials using a data store indicating authenticated entities and returning an authentication token (e.g., a JWT) on a successful validation; validating the authentication token and authorizing a communications connection; or issuing a public key associated with the authentication request.

In some embodiments, client 202 or SDIC 204 may be configured for periodically or aperiodically retrying to connect to the MDIC when a connection request attempt fails.

In some embodiments, MDIC 104 (e.g., of process 400) may be configured for: receiving, from a licensing service (e.g., update server 294, LM 120, etc.), an update request indicating that at least one node (e.g., sub node 298) needs a software update; and sending, to the at least one node, a request for initiating an updater application at the at least one node for installing the software update, where the request for initiating the updater application may include information for communicating with an update server for downloading the software update.

In some embodiments, a licensing service (e.g., update server 294, LM 120, etc.) may be configured for: prior to sending an update request: authenticating, via MDIC 104, the licensing service or a related connection to MDIC 104; requesting, from via MDIC 104, software licensing information for registered entities (e.g., from node information 109); and receiving, from MDIC 104, the software licensing information; determining, using the software licensing information, that at least one node (e.g., sub node 298) needs a software update.

In some embodiments, MDIC 104 or SDIC 204 (e.g., of process 400) may be configured for: registering a service or a service instance (e.g., one of tool(s) 126 or 128) to be discoverable and/or manageable by client 202; facilitating connections or access to the service or the service instance by advertising address information or other information for communicating with the service or the service instance; initializing or creating a new instance of the service for client 202; providing initialization or communications parameters (e.g., a unique or dynamic port number) to client 202 for facilitating communications with the service or the service instance; facilitating communications between the service or the service instance and a second service or the service instance; providing global service information indicating a plurality of available services for use by client 202 or another entity; providing information about connected or registered nodes to client 202 or another entity; providing information about services executing on or supported by a connected or registered node (e.g., main node 296, sub node 298, client 202, update server 294, tool(s) 126, tool(s) 128, etc.); sending commands for controlling the service or the service instance, or providing a network address (e.g., IP address) and/or a port number for communicating with the service or the service instance.

In some embodiments, a service, a client, or a tool may include an application or a program executing on a node. In some embodiments, the node may include a physical device, a virtual device, or a computing platform.

In some embodiments, MDIC 104 or SDIC 204 (e.g., of process 400) may be configured for supporting complex topologies and/or multiple communication mechanisms, wherein supporting complex topologies may include registering DI proxies 116 for different networks or network portions, wherein DI proxies 116 facilitate data communication between services or nodes in the different networks or network portions.

It will be appreciated that process 400 may be for illustrative purposes and that different and/or additional actions may be used. It will also be appreciated that various actions described herein may occur concurrently or in a different order or sequence.

It should be noted that a DI controller (e.g., MDIC 104, SDIC 106, SDIC 204-210, etc.), another DI entity (e.g., main node 296, sub node 298, management UI 110, authenticator 112, etc.), and/or functionality described herein may constitute a special purpose computing device. Further, a DI controller, another DI entity, and/or functionality described herein can improve the technological field of a distributed infrastructure for testing or other purposes. Furthermore, a DI controller, another DI entity, and/or functionality described herein can provide a DI environment for allowing clients, nodes, or other entities to discover and interact with each other (e.g., to request, provide, or receive services or other data). For example, in DI environment 200, MDIC 104 can advertise itself using DNS, mDNS, or other mechanisms to SDICs 204-210. In this example, each of SDICs 204-210 may register with MDIC 104 and receive an authentication token. As part of the registration, the registering entity may provide various information about itself, e.g., software licensing information, services it can support, connection information (e.g., an IP address and port number), etc. After registering itself, each of SDICs 204-210 may manage local nodes or entities (e.g., client applications) in a subnetwork or portion of DI environment 200 including, for example, facilitating registration of the local nodes or entities, e.g., client 202. Continuing with this example, registered or authenticated entities (e.g., nodes, instruments, client applications, services, etc.) may request various information from MDIC 104 or SDICs 204-210 (e.g., a controller that is local to the requesting entity (e.g., in its same network)) and may use that information and its authentication token to communicate with other registered or authenticated entities, access and control (e.g., start, pause, or stop) registered services, or initiate or facilitate software updates.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

Although specific examples and features have been described above, these examples and features are not intended to limit the scope of the present disclosure, even where only a single example is described with respect to a feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for providing a distributed infrastructure, the method comprising:
    at a main distributed infrastructure controller (MDIC) for enabling services and devices to register their presence on a network:
        sending, by the MDIC, one or more broadcast or advertisement messages via one or more mechanisms to advertise the MDIC to a client or a sub distributed infrastructure controller (SDIC);
        initiating, by the MDIC, an authentication service for authorizing and authenticating incoming connection requests from the client or the SDIC;
        receiving, by the MDIC a connection request from the client or the SDIC;
        authorizing, by the MDIC and using credentials and the authentication service, the connection request, wherein the authentication service generates or obtains an authentication token usable for secure communications; and
        providing, by the MDIC, the authentication token to the client or the SDIC.

2. The method of claim 1 comprising:
    at the client or the SDIC:
        receiving, from the MDIC, the authentication token; and
        sending, using the authentication token, a publication request for publishing an entity identifier for identifying the client, the SDIC, a service, or a service instance executing at the client or the SDIC.

3. The method of claim 1 wherein the authentication service is configured for:
    adding, deleting, or updating users;
    registering entities or services for an internet of things (IOT) framework or a network; or
    registering the entities or the services using respective credentials.

4. The method of claim 1 wherein the authentication service is configured for:
    receiving an authentication request comprising the credentials or the authentication token; and
    performing one of the following actions:
        communicating with a third-party authentication provider for authorizing and authenticating the connection request;
        validating the credentials using a data store indicating authenticated entities and returning the authentication token including a JSON web token (JWT) on a successful validation;
        validating the authentication token and authorizing a communications connection; or
        issuing a public key associated with the authentication request.

5. The method of claim 1 wherein the client or the SDIC is configured for periodically or aperiodically retrying to connect to the MDIC when a connection request attempt fails.

6. The method of claim 1 comprising:
    at the MDIC:
        receiving, from a licensing service, an update request indicating that at least one node needs a software update; and
        sending, to the at least one node, a request for initiating an updater application at the at least one node for installing the software update, where the request for initiating the updater application includes information for communicating with an update server for downloading the software update.

7. The method of claim 6 wherein the licensing service is configured for:
    prior to sending the update request:
        authenticating, via the MDIC, the licensing service or a related connection to the MDIC;
        requesting, from the MDIC, software licensing information for registered entities;
        receiving, from the MDIC, the software licensing information; and
        determining, using the software licensing information, that the at least one node needs the software update.

8. The method of claim 1 wherein the MDIC or the SDIC is configured for:
registering a service or a service instance to be discoverable and/or manageable by the client or another client;
facilitating connections or access to the service or the service instance by advertising address information or other information for communicating with the service or the service instance;
initializing or creating a new instance of the service for the client or another client;
providing initialization or communications parameters to the client or another client for facilitating communications with the service or the service instance;
facilitating communications between the service or the service instance and a second service or the service instance;
providing global service information indicating a plurality of available services for use by the client or another entity;
providing information about connected or registered nodes to the client or another entity;
providing information about services executing on or supported by a connected or registered node;
sending commands for controlling the service or the service instance; or
providing a network address and/or a port number for communicating with the service or the service instance.

9. The method of claim 1 wherein the client or a service includes an application or a program executing on a node, wherein the node includes a physical device, a virtual device, or a computing platform; or wherein the MDIC or the SDIC is configured for supporting complex topologies and/or multiple communication mechanisms, wherein supporting complex topologies includes registering distributed infrastructure (DI) proxies for different networks or network portions, wherein the DI proxies facilitate data communication between services or nodes in the different networks or the network portions.

10. A system for providing a distributed infrastructure, the system comprising:
at least one processor;
a memory; and
a main distributed infrastructure controller (MDIC) for enabling services and devices to register their presence on a network, wherein the MDIC is implemented using the at least one processor and the memory, the MDIC configured for:
sending, by the MDIC, one or more broadcast or advertisement messages via one or more mechanisms for advertising the MDIC to a client or a sub distributed infrastructure controller (SDIC);
initiating, by the MDIC, an authentication service for authorizing and authenticating incoming connection requests from the client or the SDIC;
receiving, by the MDIC, a connection request from the client or the SDIC;
authenticating, using, by the MDIC, credentials and the authentication service, the connection request, wherein the authentication service generates or obtains an authentication token usable for secure communications; and
providing the authentication token to the client or the SDIC.

11. The system of claim 10 where the client or the SDIC is configured for:
receiving, from the MDIC, the authentication token; and
sending, using the authentication token, a publication request for publishing an entity identifier for identifying the client, the SDIC, a service, or a service instance executing at the client or the SDIC.

12. The system of claim 10 wherein the authentication service is configured for:
adding, deleting, or updating users;
registering entities or services for an internet of things (IOT) framework or a network; or
registering the entities or the services using respective credentials.

13. The system of claim 10 wherein the authentication service is configured for:
receiving an authentication request comprising the credentials or the authentication token; and
performing one of the following actions:
communicating with a third-party authentication provider for authorizing and authenticating the connection request;
validating the credentials using a data store indicating authenticated entities and returning the authentication token including a JSON web token (JWT) on a successful validation;
validating the authentication token and authorizing a communications connection; or
issuing a public key associated with the authentication request.

14. The system of claim 10 wherein the client or the SDIC is configured for periodically or aperiodically retrying to connect to the MDIC when a connection request attempt fails.

15. The system of claim 10 wherein the MDIC is configured for:
receiving, from a licensing service, an update request indicating that at least one node needs a software update; and
sending, to the at least one node, a request for initiating an updater application at the at least one node for installing the software update, where the request for initiating the updater application includes information for communicating with an update server for downloading the software update.

16. The system of claim 15 wherein the licensing service is configured for:
prior to sending the update request:
authenticating, via the MDIC, the licensing service or a related connection to the MDIC;
requesting, from the MDIC, software licensing information for registered entities;
receiving, from the MDIC, the software licensing information; and
determining, using the software licensing information, that the at least one node needs the software update.

17. The system of claim 10 wherein the MDIC or the SDIC is configured for:
registering a service or a service instance to be discoverable and/or manageable by the client or another client;
facilitating connections or access to the service or the service instance by advertising address information or other information for communicating with the service or the service instance;
initializing or creating a new instance of the service for the client or another client;

providing initialization or communications parameters to the client or another client for facilitating communications with the service or the service instance;

facilitating communications between the service or the service instance and a second service or the service instance;

providing global service information indicating a plurality of available services for use by the client or another entity;

providing information about connected or registered nodes to the client or another entity;

providing information about services executing on or supported by a connected or registered node;

sending commands for controlling the service or the service instance; or providing a network address and/or a port number for communicating with the service or the service instance.

18. The system of claim 10 wherein the client or a service includes an application or a program executing on a node, wherein the node includes a physical device, a virtual device, or a computing platform.

19. The system of claim 10 wherein the MDIC or the SDIC is configured for supporting complex topologies and/or multiple communication mechanisms, wherein supporting complex topologies includes registering distributed infrastructure (DI) proxies for different networks or network portions, wherein the DI proxies facilitate data communication between services or nodes in the different networks or the network portions.

20. A non-transitory computer readable medium having stored thereon executable instructions embodied in the non-transitory computer readable medium that when executed by at least one processor of a computer cause the computer to perform steps comprising:

at a main distributed infrastructure controller (MDIC) for enabling services and devices to register their presence on a network:

sending, by the MDIC, one or more broadcast or advertisement messages via one or more mechanisms for advertising the MDIC to a client or a sub distributed infrastructure controller (SDIC);

initiating, by the MDIC, an authentication service for authorizing and authenticating, by the MDIC, incoming connection requests from the client or the SDIC;

receiving, by the MDIC, a connection request from the client or the SDIC;

authenticating, by the MDIC and using credentials and the authentication service, the connection request, wherein the authentication service generates or obtains an authentication token usable for secure communications; and providing, by the MDIC, the authentication token to the client or the SDIC.

* * * * *